United States Patent [19]

Stall et al.

[11] Patent Number: 5,003,666
[45] Date of Patent: Apr. 2, 1991

[54] METHOD AND APPARATUS FOR MAKING STUFFED CASING PRODUCTS HAVING ONE FLAT END

[75] Inventors: Alan D. Stall, Naperville; Vytas A. Raudys, Chicago, both of Ill.

[73] Assignee: Viskase Corporation, Chicago, Ill.

[21] Appl. No.: 529,300

[22] Filed: May 29, 1990

[51] Int. Cl.$^5$ .............................................. A22C 21/00
[52] U.S. Cl. ................................ 452/21; 138/118.1; 452/35; 452/45
[58] Field of Search ................ 17/49, 35, 33, 38, 41, 17/42, 1 R, 1 F; 138/118.1; 206/802; 426/138, 140, 277

[56] References Cited

U.S. PATENT DOCUMENTS

| | | | |
|---|---|---|---|
| 2,669,749 | 2/1954 | Hovland | 17/35 |
| 3,462,793 | 8/1969 | Sumption | 17/32 |
| 3,480,449 | 11/1969 | Sumption | 17/34 |
| 3,777,331 | 12/1973 | Falberg | 17/32 |
| 3,808,638 | 5/1974 | Kupcikevicius et al. | 17/35 |
| 4,160,305 | 7/1979 | Tysver | 17/49 |
| 4,466,466 | 8/1984 | Raudys | 138/118.1 |
| 4,466,984 | 8/1984 | Kupcikevicius | 138/118.1 |
| 4,557,018 | 12/1985 | Martinek | 17/49 |
| 4,562,617 | 1/1986 | Kollross | 17/49 |
| 4,621,392 | 11/1986 | Raudys | 17/33 |

FOREIGN PATENT DOCUMENTS 3716442 12/1988 Fed. Rep. of Germany .

Primary Examiner—Willis Little
Attorney, Agent, or Firm—Roger Aceto

[57] ABSTRACT

A method and apparatus for forming stuffed food products having one flat end by cutting a slit in a food casing forward of a stuffing horn and inserting an end flattening disc directly into the casing through the slit. A fixture at the end of the stuffing horn holds the disc while the slit casing is drawn forward to clear the slit away from the disc. The casing is then gathered and closed to capture the disc within the casing. On stuffing, the pressure of food product forces the disc to release from the fixture to form a flat leading end of the stuffed product.

24 Claims, 5 Drawing Sheets

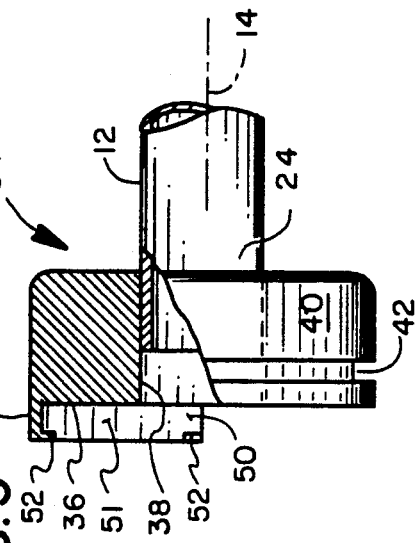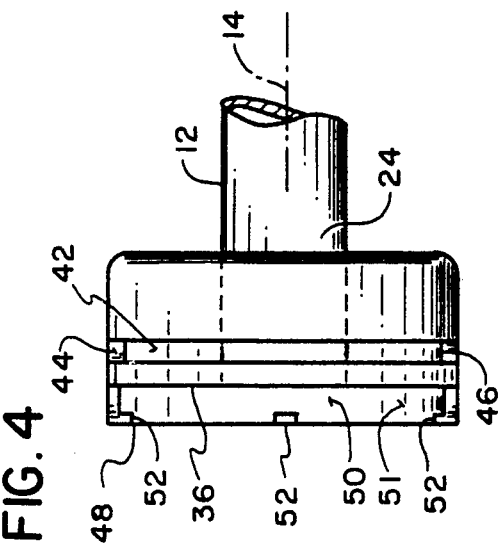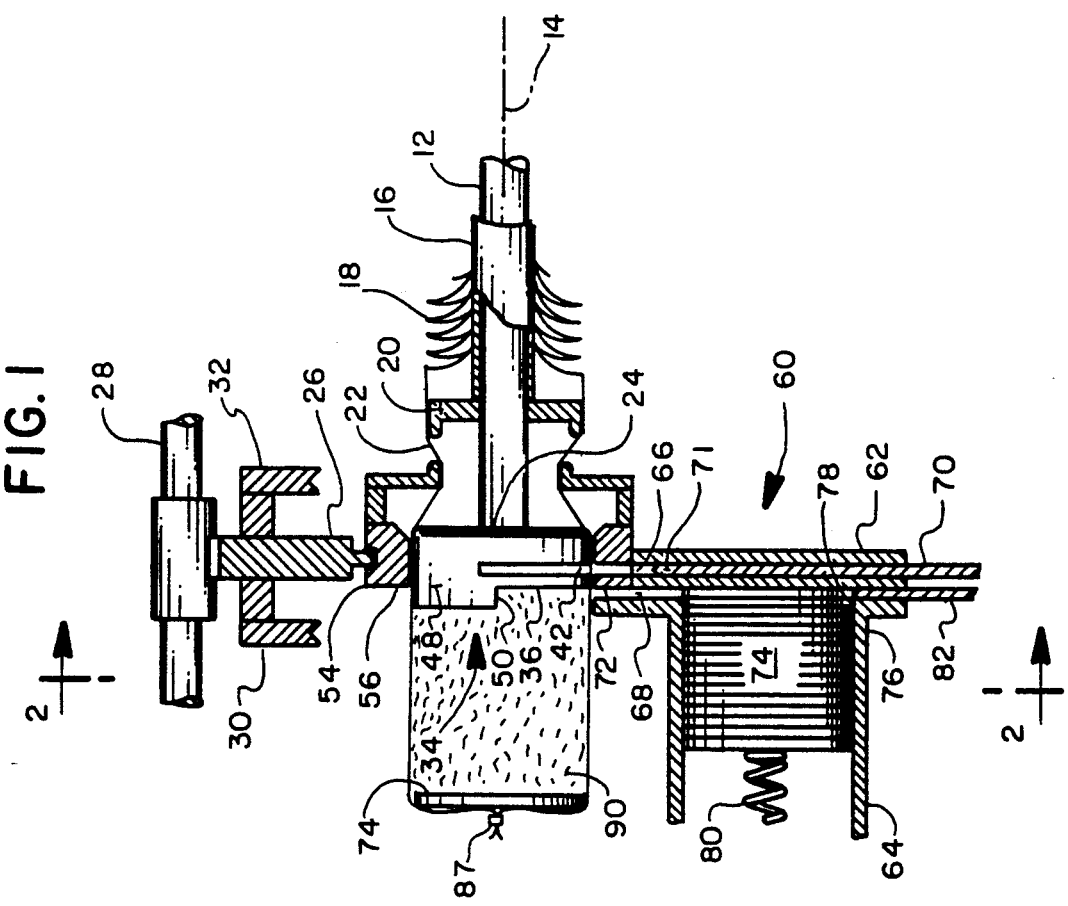

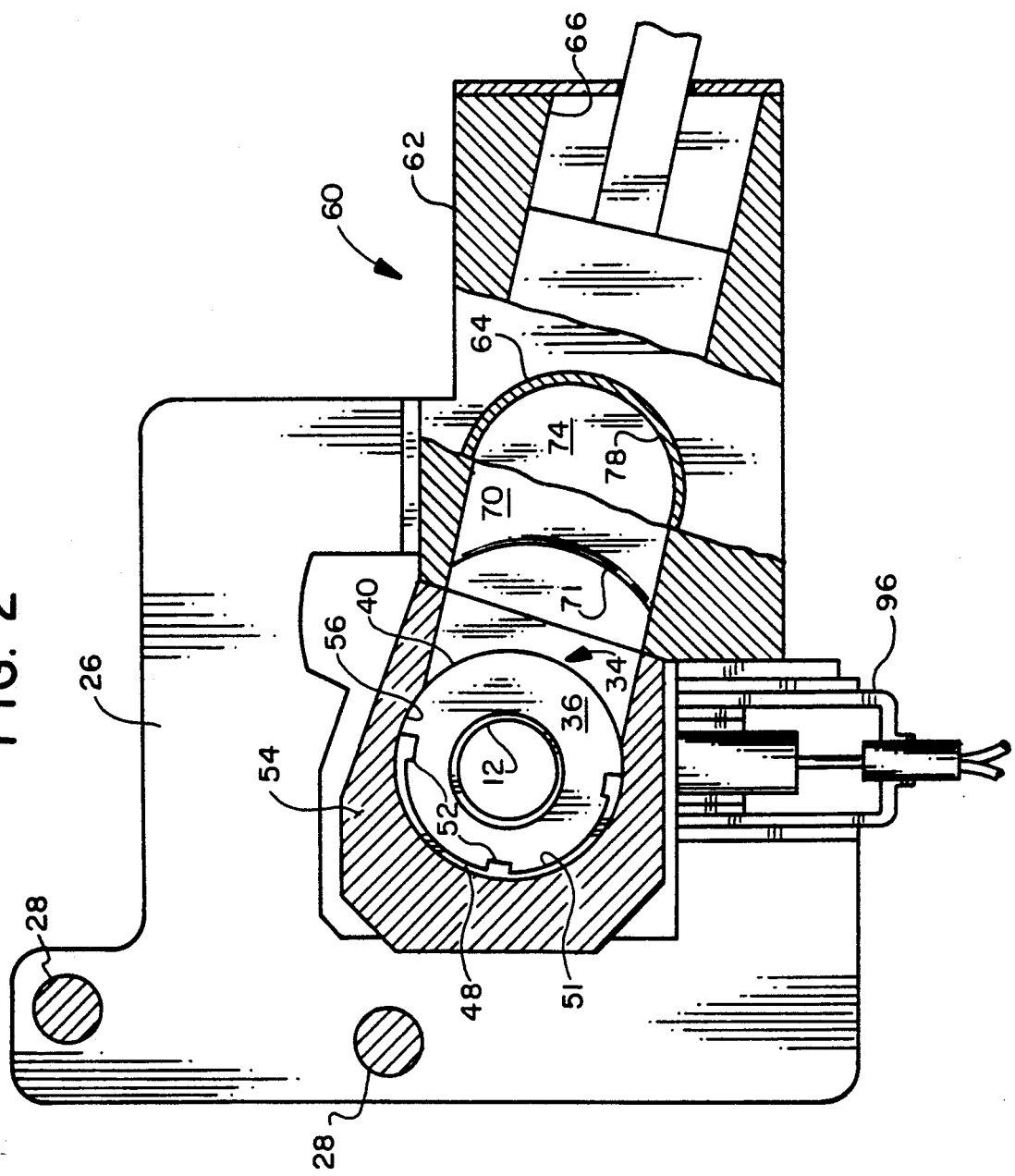

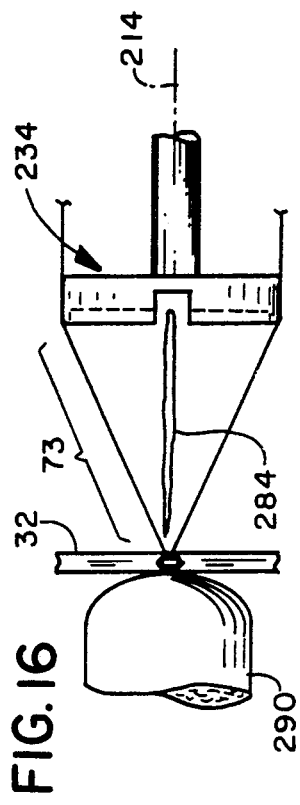
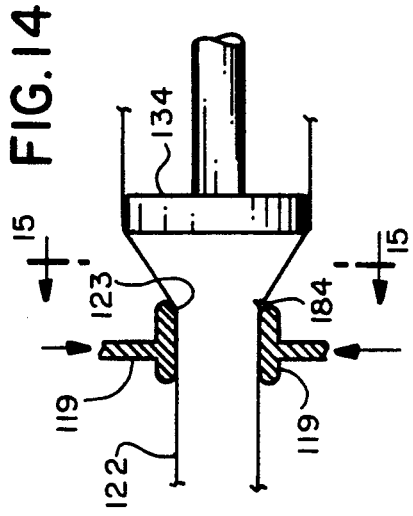
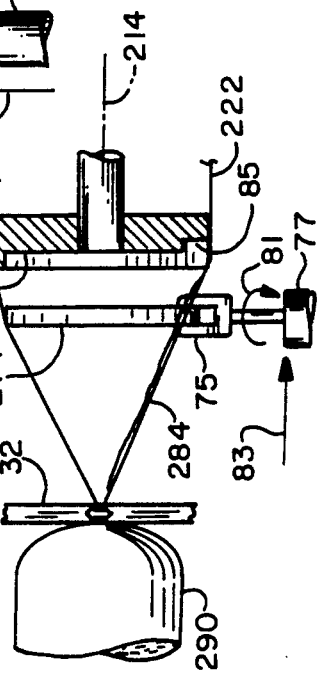
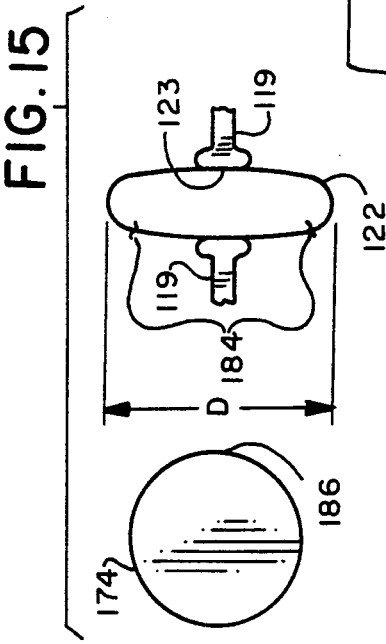

METHOD AND APPARATUS FOR MAKING STUFFED CASING PRODUCTS HAVING ONE FLAT END

FIELD OF THE INVENTION

The invention relates generally to a method and apparatus for use in the stuffing of food products into casings to produce a stuffed product such as bologna or the like having one flat end. More particularly, the invention relates to a method and apparatus for inserting a flat disc into a casing during the stuffing operation to flatten an end of the stuffed casing product.

BACKGROUND OF THE INVENTION

A stuffed casing product having at least one flat end is desirable in cases where the product is intended to be sliced and packaged for retail sales. Typically, products of this type are stuffed into a casing to a controlled diameter and then are cooked or cured according to conventional processes. Thereafter, they are sliced on an automatic slicing machine and packaged into units of predetermined weight and slice count for retail sale. The slicing devices employed in such packaging operation are preset to yield a specific weight-by-slice count for use in obtaining unit packages of equal weight.

In order to produce uniform slices for as much of the full length of the stuffed casing product as possible, it is desirable that the closed leading and/or trailing end of the stuffed product be substantially flat because rounded ends are not suited to be used for producing uniform slices for the equal weight packages sold at retail. Consequently, the round ends are sliced off and reprocessed. The reprocessed portions are called "rework".

In order to minimize the rework resulting from rounded ends, attempts have been made to flatten them by inserting flat discs into one or both ends of the casing. For example, U.S. Pat. No. 3,808,638 discloses inserting a disc into one end of a cut-length of casing to produce a single stuffed product having one flat end and one rounded end.

U.S. Pat. Nos. 3,462,793 and 4,562,617 disclose stuffing apparatus for producing food products having flat ends. The apparatus inserts a flat disc into the stuffing horn through a transverse slot. The disc is then expressed through the horn and into the casing by the food product pressing behind the disc. A limitation of this type of apparatus is that since the disc diameter must be small enough to fit through the stuffing horn, it is not effective to flatten the entire end of a product where typically the stuffed diameter is larger than the diameter of the stuffing horn.

German patent application 37 16 442 also inserts discs through a transverse slot in the stuffing horn. However, in this application each disc is made to be expandable so that when it leaves the confines of the stuffing horn, it expands to a larger diameter.

U.S. Pat. No. 4,466,984 produces stuffed products having two flat ends using discs arranged in pairs. The discs each have a central opening to accommodate passage of the stuffing horn so the discs can be loaded onto the horn. During a stuffing operation, the discs are sequentially introduced over the stuffing horn and into a casing to permit the continuous and automatic production of a plurality of flat ended stuffed casing products from a single continuous shirred length of casing.

The system as described in the '984 Patent functioned as intended in that it accomplished the automatic and continuous production of stuffed products having two flat ends. However, the assembly of the discs in pairs as required in the '984 Patent added to the cost of the discs and the central opening did allow for some waste due to the stuffed product bulging through this opening.

Also, it was found that it was not always possible to obtain the projected rework savings when automatically slicing a stuffed product having two flat ends. This is due to limitations of the automatic slicing apparatus which is designed primarily to accommodate stuffed products having rounded ends. Consequently, in some cases, a stuffed product having one rounded end and one flat end can produce a greater rework savings than one having two flat ends.

A copending application Ser. No. 07/381,238 discloses an arrangement of annular discs useful for producing stuffed casing products having one flat end. While the disc construction is simplified compared to that disclosed in the '984 Patent, it still has a central opening which allows for some waste due to the stuffed product bulging through the opening thereby increasing the amount of rework.

SUMMARY OF THE INVENTION

In the present invention, a shirred length of casing is loaded onto a stuffing horn in a conventional manner. Casing drawn forward from the shirred length is expanded to substantially its fully opened diameter which, generally, is slightly less than the stuffed diameter of the casing. A transverse slit extending about 180° around the casing perimeter is made just forward of the stuffing horn discharge end. A flat disc is then inserted though the slit into the casing wherein the 180° slit in the full open casing is able to accommodate the diameter of the flat disc. The casing is pulled forward so the slit portion clears over the disc and then it is gathered and closed to capture the disc within the casing.

The disc preferably is "full face" in that it is a solid piece having a diameter which is any desired size up to the stuffed diameter of the casing without requiring any hole or discontinuity within the disc itself. The disc does not pass over the stuffing horn as disclosed in the '984 Patent so it need not have a central opening and it does not pass through the stuffing horn so its diameter is not limited to the horn inside diameter and it need not be expandable.

In accordance with the present invention, a conventional stuffing apparatus is easily modified to incorporate a knife for slitting the casing just forward of the stuffing horn and a means for inserting the end flattening disc through the slit. A fixture mounted to the discharge end of the stuffing horn expands the casing and facilitates the cutting of the casing. It also holds the disc in a proper stuffing orientation in front of the discharge end of the stuffing horn once inserted into the casing. Preferably a plurality of the end flattening discs are contained in a magazine. The magazine has a dispensing end arranged so that individual discs removed from the magazine are directed through the casing slit and onto the disc holding fixture.

In particular, a method of the '984 present invention is characterized by the steps of (a) locating a supply of casing to be stuffed on a stuffing horn and drawing a portion of the casing forward from the supply to locate a section of the casing forward of the stuffing horn;

(b) cutting a slit in said section of casing;
(c) inserting a disc having a flat face through said slit and into said section of casing and orienting said flat face substantially perpendicular to the longitudinal axis of the stuffing horn;
(d) drawing said section of casing forward relative to said disc to move said slit from said disc thereby locating said disc within an unbroken perimeter of casing and forming an intermediate longitudinal portion of said casing section between said slit and disc;
(e) gathering said intermediate portion of said casing section towards the longitudinal axis of the stuffing horn and then closing the gathered casing at a position between said slit and disc thereby capturing said disc within said closed casing; and
(f) stuffing a food product under pressure into said closed casing and against said disc to produce a stuffed product having a leading end defined by the flat face of said disc.

In another aspect, an apparatus of the present invention is characterized by
(a) a fixture on the discharge end of the stuffing horn having an annular outer surface generally concentric with said stuffing axis and adapted to provide internal support for a casing drawn over said fixture;
(b) said fixture having a flat end face disposed transverse said stuffing axis and said flat end face having a central opening providing a passage for the discharge of food product from said stuffing horn;
(c) disc holding means disposed on said end face for receiving and holding an end flattening disc against said end face and across said central opening;
(d) cutting means for cutting a slit in a section of the casing forward of said fixture;
(e) means for holding a supply of end flattening discs to be inserted into said casing;
(f) disc inserting means for moving a disc from said supply through said slit and into engagement with said disc holding means;
(g) means for drawing said section of casing forward to move said slit from a said inserted disc thereby locating said disc within an unbroken perimeter of casing and forming a longitudinal portion of said casing section intermediate said slit and a said inserted disc;
(h) a clipper for gathering and closing the intermediate portion of casing thereby capturing a said inserted disc within the closed casing; and
(i) said holding means adapted to release a said inserted disc responsive to the discharge pressure of food product from said opening to form the flattened leading end of a stuffed product.

DESCRIPTION OF THE DRAWINGS

FIG. 1 is a top plan view, partly broken away and in section showing an apparatus embodiment of the present invention;

FIG. 2 is a front elevation view taken along lines 2—2 of FIG. 1 with some portions omitted and others broken away;

FIGS 3–5 are top, side and front elevation views respectively of a disc holding fixture at the end of a stuffing horn according to the present invention;

FIG. 14 is a top plan view illustrating in schematic fashion another embodiment of the present invention;

FIG. 15 is a view taken along lines 15—15 of FIG. 14;

FIG. 16 is a side elevation view illustrating yet another embodiment of the present invention; and FIGS. 17 and 18 are top plan views showing a sequence of steps in the operation of the FIG. 16 embodiment.

DETAILED DESCRIPTION OF THE INVENTION

Figure 7:
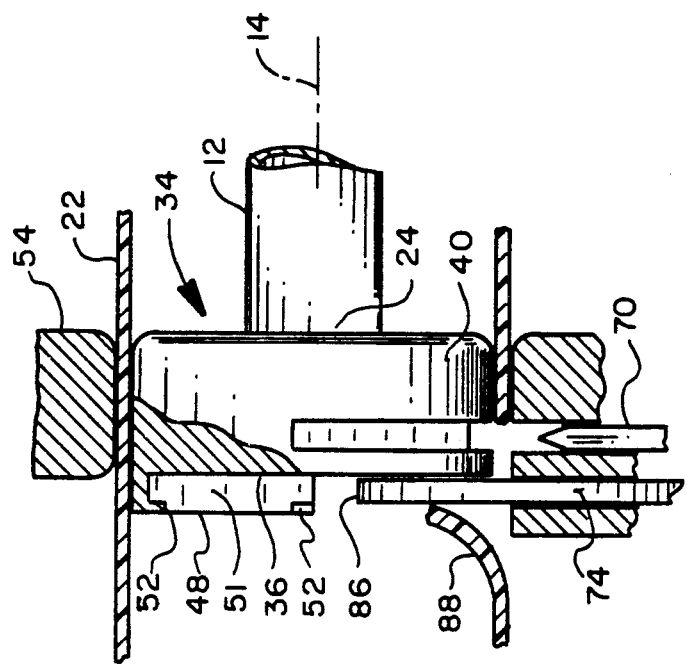
FIGS 6 and 7 are top plan views, on an enlarged scale of the disc holding fixtuer showing respectively the cutting of the casing and the insertion of a disc into the casing to be stuffed.

Referring to the drawings, FIG. 1 shows a stuffing apparatus of the type generally described in U.S. Pat. No. Re.30,390. Conventional portions of the stuffing machine, not essential to an understanding of the present invention, have been omitted.

The apparatus includes a stuffing horn 12 disposed along a stuffing axis 14. Slidably disposed about the horn is a sleeve 16 which carries a supply of shirred casing 18. Preferably the casing is a fibrous reinforced regenerated cellulose casing although other casing materials such as a tubular plastic film may be used.

Disposed at the fore end of the sleeve is a sizing disc 20. The function of sizing disc 20 is well known in the art. Briefly, it is to open and unwrinkle casing 22 which deshirrs from the shirred casing 18 and/or to circumferentially stretch the casing prior to stuffing. Preferably, the diameter of the sizing disc is substantially equal to the stuffed diameter of the casing so the casing stretches circumferentially as it passes over the disc. While the disc can be detachable from the sleeve to replace casing, it is preferred to provide the sleeve 16, shirred casing 18 and disc 20 as a unitary article as disclosed, for example, in U.S. Pat. No. 4,570,292.

Disposed adjacent the discharge end 24 of the stuffing horn is a clipper carriage, a portion of which is shown at 26. The clipper carriage is conventional and is slidably supported by a pair of rods 28 arranged parallel to the stuffing axis 14. Means (not shown) are provided for moving the clipper carriage along the rods between the position shown in FIG. 1 and a position spaced forward (to the left as viewed in FIG. 1) from the stuffing horn discharge end 24.

Mounted on the clipper carriage are a pair of clippers, portions of which are shown at 30, 32. The clippers are conventional and need not be described in detail. It is sufficient for purposes of the present invention to say the clippers 30, 32 operate in a well known manner in that they gather casing towards the stuffing axis 14 and then apply a closure (usually a metal clip) to the gathered casing. For purposes of reference, clipper 30 will be referred to hereafter as the "second tie clipper" and clipper 32 as the "pretie clipper".

Disposed at the stuffing horn discharge end 24 is a disc holding fixture generally indicated at 34. The fixture is annular having an outside diameter no bigger than the stuffed diameter of the casing. Preferably the diameter of the fixture is such that it imparts little or no circumferential stretch to the casing passing over the fixture. For example, the diameter of the fixture preferably is about equal to the inflated diameter of the casing. "Inflated diameter" is generally understood to mean the fully expanded but unstretched diameter of the casing.

Figure 5:
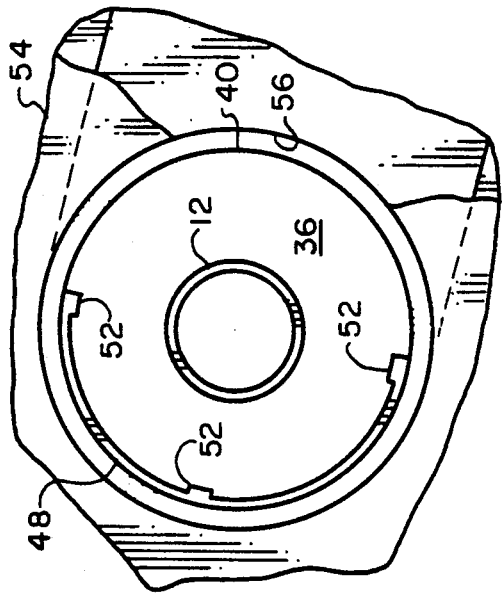

As best seen in FIGS. 3–5, the disc holding fixture 34 is an annular block having a flat front end face 36 disposed in a plane transverse and substantially perpendicular to stuffing axis 14. An axial bore 38 extends through the block and receives the stuffing horn discharge end 24 so the block can be mounted to the horn.

The outer circumference of the block is defined by a smooth outer surface 40. Extending into the block from its outer surface 40 is a slot 42. The slot is oriented in a plane parallel to the front end face 36 so it too is transverse the stuffing axis 14. The slot extends around the fixture so its opposite ends 44 and 46 (FIG. 4) are slightly more than 180° apart. Thus, as seen in the side elevation view of FIG. 4, slot 42 extends the full height of the fixture.

On the side of the fixture opposite slot 42, the outer surface 40 of the fixture is extended forward of the end face 36 to form a shoulder 48 perpendicular to the end face. The shoulder encompasses about 180° of arc about the fixture so there is an open side or inlet to the shoulder as shown at 50 (FIGS. 3 and 4). This open side or inlet allows an end flattening disc (not shown) to slide across the flat end face 36 of the fixture and seat against the inside arcuate surface 51 of the shoulder as further set out hereinbelow.

The shoulder is provided with tabs 52 that are spaced at 90° intervals about the shoulder and extend radially inward from the edge of the shoulder (FIGS. 4 and 5). The tabs serve to retain an end flattening disc against the flat end face 36 (as described hereinbelow) so the shoulder and tabs together comprise a means for receiving and holding an end flattening disc.

As shown in FIGS. 1 and 2, a seal ring 54 is carried by the clipper carriage. The seal ring has a central opening 56 slightly larger than the outside diameter of the disc holding fixture 34. The seal ring is free to float radially with respect to the stuffing axis 14 (as is known in the art) so it is self centering around the disc holding fixture. During stuffing, the casing 22 passes through the seal ring opening 56. The close proximity of the seal ring inner surface to the disc holding fixture outer surface 40 prevents food product from back flowing around the fixture.

Also mounted to the clipper carriage is a device generally indicated at 60, for slitting the casing and inserting an end flattening disc. As best seen in FIG. 1, device 60 includes a guide portion 62 and a magazine portion 64. The guide portion 62 has two side-by-side passages 66 and 68. The first passage 66 aligns with slot 42 in the disc holding fixture. Disposed in the first passage 66 is a knife member 70 which is movable through the first passage and into slot 42. As shown in FIG. 2 the cutting edge 71 of the knife 70 is concave to fit into slot 42. However, the knife edge can be a straight edge or pointed if the slot 42 is made deep enough to receive such a configuration for purposes of slitting the casing as described hereinbelow.

The second passage 68 aligns generally with the open side 50 of shoulder 48. In this respect, passage 68 is defined in part by a surface 72 which lies generally in the same plane as the front end face 36 of the disc holding fixture 34. With this arrangement, a disc 74 moving through passage 68 will slide across the end face 36 and come to rest against the inner surface 51 of shoulder 48 and behind tabs 52.

Magazine portion 64 is arranged to deliver end flattening discs 74 to the passage 68 and comprises a cylindrical structure which contains a plurality of the end flattening discs stacked one against another. One end 76 of the magazine communicates through an opening 78 with passage 68. Any suitable means, such as a spring 80, urges the discs in the magazine through the opening 78 and into passage 68. A pusher 82 in the passage is operated to move a single disc through the passage and across the front surface 36 of the disc holding fixture.

Figure 6:
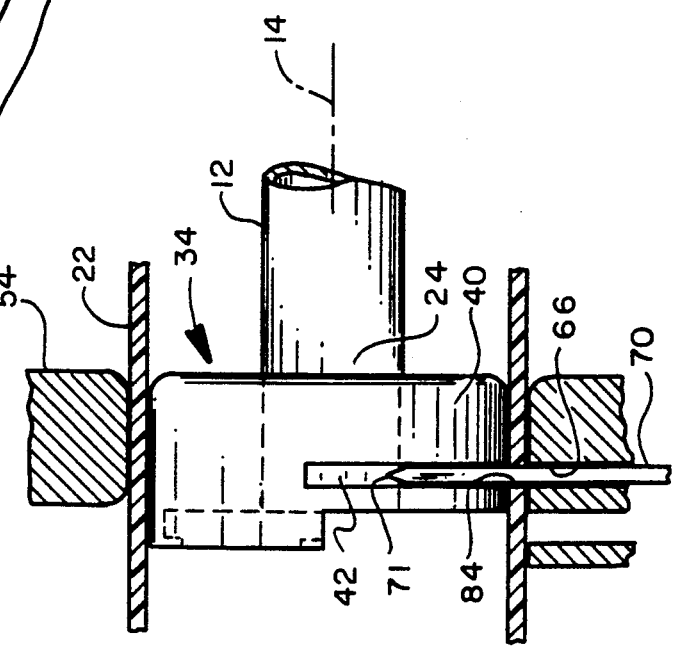

Cutting the casing and inserting a disc is most clearly illustrated in FIGS. 6 and 7. As shown in FIG. 6, casing 22 is between sealing ring 54 and disc holding fixture 34. The close proximity of the sealing ring to the fixture orients the casing against the outer surface 40 of the disc holding fixture. In this position the casing spans slot 42 so when knife 70 is pressed through guide passage 66 it pierces the casing and enters the slot. The casing is supported by portions of the fixture surface 40 on either side of slot 42 so the knife can cut cleanly into the casing. The knife is pressed through the casing until it has cut a slit 84 which extends about 180° around the substantially fully opened casing so as to accommodate the passage of a disc for insertion into the casing.

To insert a disc 74 into the slit casing, the pusher 82 (FIG. 1) is moved through its guide passage 68 until it strikes a disc 74 disposed in the passage. The pusher then moves the disc through the passage towards the casing. FIG. 7 shows that as a leading edge 86 of the disc contacts the casing, a portion 88 of the casing adjacent the slit is deflected inward towards the stuffing axis 14. This opens the slit as shown and allows the disc to pass into the casing and slide across the holding fixture end face 36. The disc continues to travel across the flat end face 36 until it rests against the inner surface 51 of the annular shoulder 48 and is captured behind tabs 52.

Reference is now made to FIGS. 8-13 to describe the steps of a stuffing and disc inserting operation according to the method and apparatus of the present invention. The operation will be described as beginning when the second tie clipper 30 is operated to gather and close off the stuffed casing with a metal clip 87 thereby forming a rounded trailing end 89 of a stuffed product 90.

Figure 9:
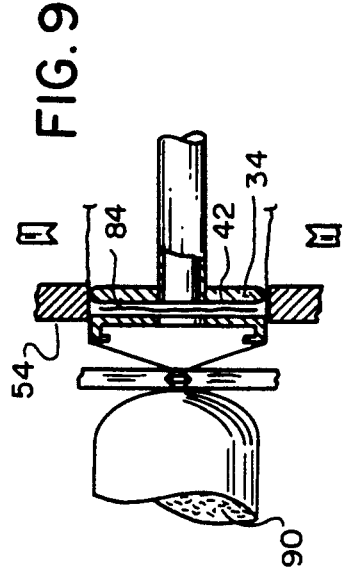
Figure 10:
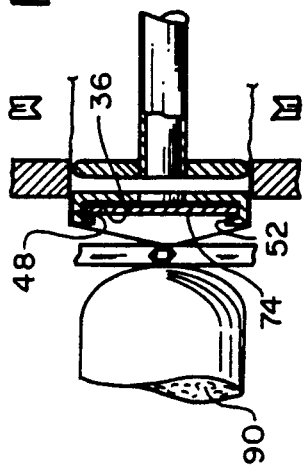

The knife 70 (FIG. 1) is operated to cut a slit 84 in the casing as described hereinabove. FIG. 9 illustrates the casing slit 84 aligned with the slot 42 in the disc holding fixture 34. Then the pusher 82 (FIG. 1) is operated to move an end flattening disc 74 into the casing as previous described. FIG. 10 shows a disc 74 inserted into the casing and received onto the annular shoulder 48 disc holding fixture. In this position the end flattening disc 74 is upright against the flat end face 36 of the disc holding fixture and behind tabs 52.

Figure 11:
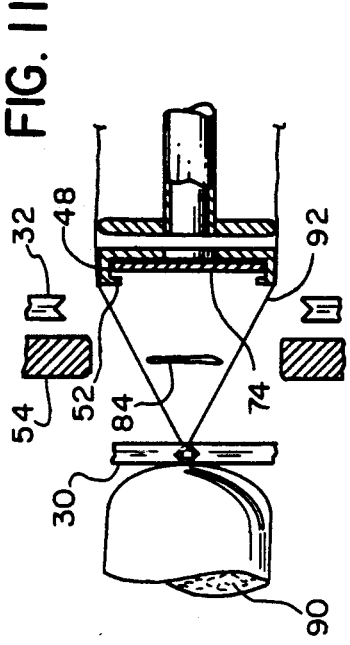
FIGS. 8–13 illustrate the steps in the method of the present invention and using the apparatus of the present invention for making a stuffed product having one flat end.
Figure 12:
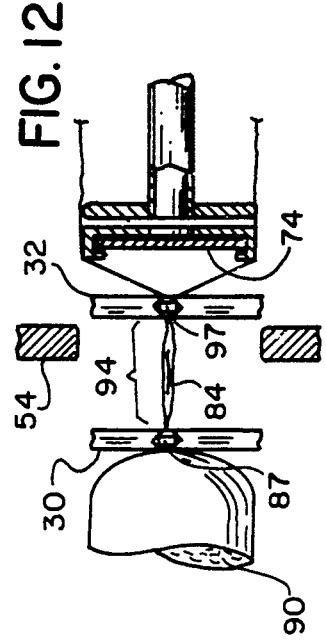

After the disc is inserted into the casing and is received by the disc holding fixture, the clipper carriage 26 (FIG. 1) is indexed forward or to the left as shown in the figures. The second tie clipper 30 remains closed so the stuffed product 90 is pushed forward as shown in FIG. 11. This also pulls casing forward from the shirred supply so that the slit 84 clears over the disc 74. The disc is no bigger and preferably is slightly smaller than the inflated diameter of the casing. Nevertheless, as the casing pulls forward, it drags across that portion (not shown) of the disc which is out from under shoulder 48 at the open side of the shoulder. Since disc 74 is captured behind tabs 52, the disc is restrained from being pulled forward by the casing which drags across the disc. In this fashion, the disc is retained by the disc holding fixture as the clipper carriage 26 indexes forward.

The clipper carriage indexes forward until the slit 84 in the casing clears over and away from the disc. This locates the disc within the unbroken perimeter of the casing and forms an intermediate portion of casing 92 between the slit 84 and the end flattening disc 74. The pre tie clipper 32 is then operated (FIG. 12) to gather and close the intermediate portion of casing in front of the disc. This isolates the slit 84 in a section 94 of the gathered casing between the closures 87, 97 applied by the clippers 30, 32 respectively. If desired, the casing now can be severed between the clips by a conventional cutting device 96 (FIG. 2) attached to the clipper carriage 26.

Figure 13:
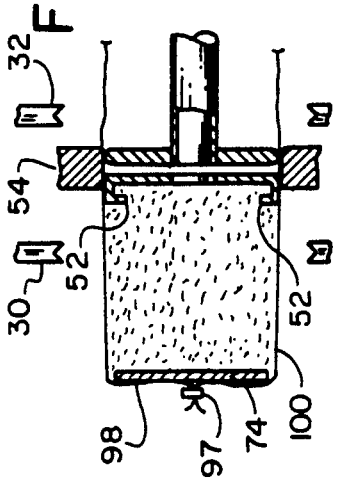
Figure 8:
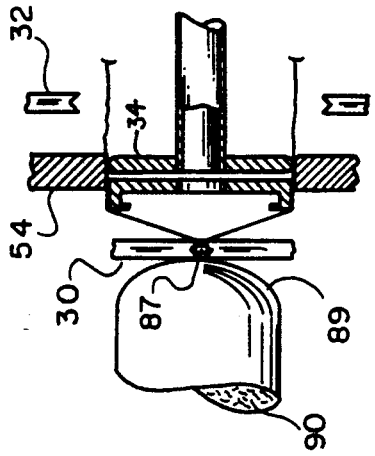

After the pre tie clip 97 is applied, the clippers 30, 32 open and the clipper carriage 26 returns to the position shown in FIG. 1 and then stuffing begins. The pressure exerted by the food product against the disc 74 is sufficient to force the disc to release from the tabs 52 and the shoulder 48. As shown in FIG. 13, the disc 74 is forced against the closed end 98 of the casing while food product fills in behind the disc. This flattens the closed end to form the flat leading end 98 of a stuffed product 100. Stuffing continues until the desired stuffed length is produced. At this point, stuffing stops and the stuffed casing is again gathered and closed as shown in FIG. 8.

In the operation as described with respect to FIGS. 8–13, some food product may remain in the disc holding fixture after the trailing end of the product is closed. Food product in the fixture may interfere with proper disc insertion or may result in some product being captured between the second tie clip 87 and the disc holding fixture. To minimize the risk of food product in the fixture prior to disc insertion, it may be desirable to incorporate a draw back means (not shown) for creating a partial vacuum in the stuffing horn so food product is sucked from the disc holding fixture and back into the stuffing horn.

The invention has been described in connection with a preferred embodiment wherein the casing is open to its full diameter and a transverse slit is made which extends 180° about the casing for disc insertion. However, if the casing is forced to an oval shape, the transverse slit can extend for less than 180° about the casing and still accommodate the entry of a full face extender. As shown in the schematic representation of FIGS. 14 and 15, the casing 122 at or forward of the disc holding fixture 134 is deformed to a generally oval shape by members 119 pressing inward against the sides of the casing. The transverse slit 184 cut in the casing has a minimum length at least equal to the diameter of the disc 174 to be inserted (FIG. 15). However, the length of the slit is shorter than the major diameter "D" of the casing oval and therefore extends for less than 180° around the casing. The disc 174 then is moved transversly towards the casing for insertion through the slit. As the disc is inserted, its leading edge 186 will press against the casing inside surface 123 opposite the slit 184 and force the casing to assume a rounded configuration. After insertion, the disc and holding fixture are moved longitudinally one with respect to another to seat the disc against holding fixture. Then the casing is drawn forward and closed as described hereinabove with respect to FIGS. 11 and 12. This will capture the slit 184 between the clips applied by the second tie clipper 30 and pretie clipper 32.

In the embodiments of FIGS. 1–15 the slit 84, 184 is a transverse slit and the disc 74, 174 is upright with respect to the stuffing axis when inserted through the slit. In the embodiment as shown in FIGS. 16–18, the casing is slit lengthwise and the disc is oriented parallel to the stuffing axis for insertion. In this respect, the side elevation view of FIG. 16 shows the stuffed product 290 moved forward from the disc holding fixture 234 to provide a section of casing 73 between the product and the fixture. The length of casing section 73 is greater than the diameter of the disc to be inserted. A longitudinal slit 284 is then cut in the casing wherein the length of the slit is at least equal to the diameter of the disc to be inserted.

The plan view of FIG. 17 shows a flat disc 274 gripped in the fingers 75 of a disc inserting means 77. The fingers are extendable from the inserting means in the direction of arrow 79 so the disc can be pressed through the slit and into the casing. The fingers 75 also are rotatable with respect to the inserting means 77 in the direction of arrow 81 about an axis transverse the stuffing axis 214. The rotation of the fingers carries the disc 274 to an upright orientation transverse the stuffing axis 214 as shown in FIG. 18. As also shown in FIG. 18, the disc inserting means 77 is translatable longitudinally in the direction of arrow 83 along a path parallel to the stuffing axis 214. This carries the disc 274 towards the end face 236 of the disc holding fixture 234. A notch 85 in the end face of the fixture accommodates the fingers 75 so the disc 274 can be received against the end face 236 of the fixture.

After the disc is seated against the end face of the fixture, the fingers 75 are withdrawn (not shown). The casing containing slit 284 is drawn forward to insure that the disc is located in an unbroken perimeter of casing and then it is gathered and closed as described hereinabove with respect to FIGS. 11 and 12 to capture the longitudinal slit 284 in a section of casing between the clips applied by the second tie clipper 30 and pretie clipper 32.

It should be appreciated that since slit 284 is longitudinal the length of the casing section 73 required to accommodate the slit is necessarily longer than the comparable section of casing needed to accommodate the slit 84 of the embodiment shown in FIGS. 1–13. Accordingly, a method embodiment according to FIGS. 16–18 will produce more waste (unstuffed) casing than the method embodiment according to FIGS. 8–13.

Thus, the method and apparatus of the present invention provides for the production of stuffed products having one flat end without the need to pass the end flattening disc through or over a stuffing horn. Instead, the discs are inserted into the casing from an external supply after the casing is slit to provide an opening for the entry of a disc. This permits use of full face discs for flattening the end of a stuffed product. That is, the discs can be substantially the same diameter as the stuffed casing because they are not inserted through a stuffing horn and since they do not pass over a stuffing horn they do not need a central opening. Moreover, since the discs are not disposed on a horn (as in U.S. Pat. No. 4,466,984) substantially the full length of the horn is available to accommodate casing for stuffing.

Having described the invention in detail,

What is claimed as new is:

1. A method of producing stuffed products having one flat end comprising the steps of:
    (a) locating a supply of casing to be stuffed on a stuffing horn and drawing a portion of the casing forward from the supply to locate a section of the casing forward of the stuffing horn;
    (b) cutting a slit in said section of casing;
    (c) inserting a disc having a flat face through said slit and into said section of casing and orienting said flat face substantially perpendicular to the longitudinal axis of the stuffing horn;

(d) drawing said section of casing forward relative to said disc to move said slit from said disc thereby locating said disc within an unbroken perimeter of casing and forming an intermediate longitudinal portion of said casing section between said slit and disc;

(e) gathering said intermediate portion of said casing section towards the longitudinal axis of the stuffing horn and then closing the gathered casing at a position between said slit and disc thereby capturing said disc within said closed casing; and (f) stuffing a food product under pressure into said closed casing and against said disc to produce a stuffed product having a leading end defined by the flat face of said disc.

2. A method as in claim 1 comprising:

(g) stopping said stuffing when a desired length of casing is stuffed;

(h) gathering and closing the stuffed casing to form a trailing end which is rounded as compared to said leading end; and (i) repeating steps (b)–(h) until the supply of casing on said stuffing horn is exhausted.

3. A method as in claim 1 comprising cutting a transverse slit in said section of casing and orienting said disc substantially perpendicular to the longitudinal axis of the stuffing horn for inserting into said section of casing through said transverse slit.

4. A method as in claim 3 comprising cutting said transverse slit substantially 180° about said casing perimeter.

5. A method as in claim 3 comprising supporting said casing internally while cutting said slit.

6. A method as in claim 5 comprising cutting said slit by piercing said internally supported casing with a knife member that is movable in a transverse plane adjacent the discharge end of the stuffing horn.

7. A method as in claim 6 comprising inserting said disc by transversely moving it against said casing in a plane located forward of said knife member and thereby deflecting a portion of the casing inward and opening said slit for the passage of said disc.

8. A method as in claim 7 wherein inserting said disc is accomplished by moving it from a stacked supply of said discs and biasing said stacked supply such that another disc assumes the position in said stack vacated by said inserted disc.

9. A method as in claim 1 wherein said disc in a solid member having a diameter no greater than the inflated diameter of the casing.

10. A method as in claim 1 comprising cutting a longitudinal slit in said section of casing and orienting said disc with its flat face parallel to the axis of the stuffing horn for inserting into said section of casing.

11. A method as in claim 10 comprising turning the disc within the casing after said inserting to orient the flat face of the disc upright and transverse the longitudinal axis of the stuffing horn.

12. Apparatus for producing stuffed products having one flat end comprising:

(a) a fixture on the discharge end of the stuffing horn having an annular outer surface generally concentric with said stuffing axis and adapted to provide internal support for a casing drawn over said fixture;

(b) said fixture having a flat end face disposed transverse said stuffing axis and said flat end face having a central opening providing a passage for the discharge of food product from said stuffing horn;

(c) disc holding means disposed on said end face for receiving and holding an end flattening disc against said end face and across said central opening;

(d) cutting means for cutting a slit in a section of the casing forward of said fixture;

(e) means for holding a supply of end flattening discs to be inserted into said casing;

(f) disc inserting means for moving a disc from said supply through said slit and into engagement with said disc holding means;

(g) means for drawing said section of casing forward to move said slit from a said inserted disc thereby locating said disc within an unbroken perimeter of casing and forming a longitudinal portion of said casing section intermediate said slit and a said inserted disc;

(h) a clipper for gathering and closing the intermediate portion of casing thereby capturing a said inserted disc within the closed casing; and (i) said holding means adapted to release a said inserted disc responsive to the discharge pressure of food product from said opening to form the flattened leading end of a stuffed product.

13. Apparatus as in claim 12 wherein said cutting means is movable in a plane transverse the stuffing axis towards said fixture outer surface and said outer surface providing an internal support for the casing as said cutting means pierces the casing.

14. Apparatus as in claim 13 wherein said disc inserting means includes a member movable in a plane transverse said stuffing axis and parallel with the plane of said end face, said member having a surface engageable against an end flattening disc in said supply.

15. Apparatus as in claim 14 wherein said cutting means is adapted to cut a transverse slit which extends substantially 180° about said section of casing.

16. Apparatus as in claim 12 wherein said cutting means is adapted to cut a longitudinal slit in said casing.

17. Apparatus as in claim 16 wherein:

(a) said disc inserting means has a transversely movable portion including disc gripping fingers for gripping and inserting a said end flattening disc through said longitudinal slit;

(b) said disc gripping fingers being rotatable about an axis transverse the longitudinal axis of the stuffing horn for moving a said disc within the casing from a longitudinal orientation to an upright orientation; and (c) said disc inserting means being movable longitudinally for carrying a said upright oriented disc against said fixture end face.

18. Apparatus as in claim 12 wherein said disc holding means comprises a shoulder perpendicular to said end face and extending in an arc of substantially 180° around said end face, said shoulder having an outer arcuate surface which is an extension of said fixture outer surface and an inner arcuate surface for receiving thereagainst an annular edge of an end flattening disc.

19. Apparatus as in claim 18 including tab members disposed along said shoulder which project radially inward from an edge of said shoulder to grip and retain an end flattening disc against said fixture end face.

20. Apparatus as in claim 12 wherein said cutting means is carried by said clipper.

21. Apparatus as in claim 12 wherein said means for holding a supply of end flattening discs is a magazine carried by said clipper.

22. Apparatus as in claim 12 comprising a guide member having two side-by-side passages oriented in a plane transverse the stuffing axis, said cutting means being disposed in one of said passages and said disc inserting means being disposed in the second passage.

23. Apparatus as in claim 22 wherein said means for holding a supply of end flattening discs is a magazine having an outlet communicating with said second passage and bias means in said magazine for urging the discs therein towards said outlet and into said passage.

24. Apparatus as in claim 23 wherein said guide and magazine are carried by said clipper.

* * * * *